US012165858B2

(12) United States Patent
Kimura et al.

(10) Patent No.: US 12,165,858 B2
(45) Date of Patent: Dec. 10, 2024

(54) THERMIONIC POWER GENERATION ELEMENT AND THERMIONIC POWER GENERATION MODULE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shigeya Kimura, Yokohama (JP); Masaya Yamamitsu, Kamakura (JP); Hisao Miyazaki, Yokohama (JP); Hisashi Yoshida, Kawasaki (JP); Hiroshi Tomita, Yokohama (JP); Souichi Ueno, Ota (JP); Takeshi Hoshi, Yokohama (JP); Tomoya Takeda, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 211 days.

(21) Appl. No.: 17/651,932

(22) Filed: Feb. 22, 2022

(65) Prior Publication Data

US 2023/0066425 A1 Mar. 2, 2023

(30) Foreign Application Priority Data

Aug. 25, 2021 (JP) ................................ 2021-136910

(51) Int. Cl.
*H01J 45/00* (2006.01)

(52) U.S. Cl.
CPC .................................... *H01J 45/00* (2013.01)

(58) Field of Classification Search
CPC ..... H01L 35/00; H01L 37/00; H01L 29/6653; H01L 29/6656; H01J 45/00; H01J 9/185
(Continued)

(56) References Cited

U.S. PATENT DOCUMENTS 3,173,032 A * 3/1965 Maynard ................ H01J 45/00 310/306
3,267,308 A * 8/1966 Hernqvist .............. H01J 45/00 310/306
(Continued)

FOREIGN PATENT DOCUMENTS

JP S 60-190192 A 12/1985
JP WO 02/013367 A1 2/2002
(Continued)

OTHER PUBLICATIONS

Lee, J. et al. "Microfabricated Silicon Carbide Thermionic Energy Converter for Solar Electricity Generation" MEMS 2012, Paris, France, Jan. 29-Feb. 2, 2012, Stanford University (4 pages).
(Continued)

*Primary Examiner* — Maged M Almawri
(74) *Attorney, Agent, or Firm* — Oblon, McClelland, Maier & Neustadt, L.L.P.

(57) ABSTRACT

According to one embodiment, a thermionic power generation element includes a cathode, an anode, and an insulating member. The cathode includes an electrically-conductive material. The anode includes an electrically-conductive material. The insulating member is located between the cathode and the anode. The cathode and the anode have a gap between the cathode and the anode. A first through-hole is provided in the anode. The first through-hole extends through the anode in a first direction and communicates with the gap. The first direction is from the cathode toward the anode.

18 Claims, 9 Drawing Sheets

(58) Field of Classification Search
USPC .......................... 310/306, 305; 135/205, 208
See application file for complete search history.

(56) References Cited

U.S. PATENT DOCUMENTS 3,312,840 A * 4/1967 Gabor ..................... F23D 14/66 976/DIG. 417
4,641,031 A * 2/1987 Ito ........................... H01J 27/14 376/127
4,995,069 A * 2/1991 Tanaka ..................... H05G 1/10 378/101
5,459,367 A * 10/1995 Davis ...................... H01J 45/00 310/306
5,589,731 A * 12/1996 Fahlen .................. H01J 31/126 445/24
5,614,781 A * 3/1997 Spindt ................... H01J 29/085 313/422
5,929,720 A * 7/1999 Hirata .................. H01Q 19/191 315/5
6,509,669 B1 * 1/2003 King ....................... H01J 45/00 310/306
6,653,547 B2 11/2003 Akamatsu
6,946,596 B2 * 9/2005 Kucherov .............. H10N 10/00 136/238
7,129,616 B2 * 10/2006 Davis ...................... H01J 45/00 310/306
7,427,786 B1 * 9/2008 Cox ....................... H10N 15/00 257/729
7,608,974 B2 * 10/2009 Sung ...................... H10N 15/00 310/306
9,951,671 B2 * 4/2018 Kimura .................... H02N 3/00
10,147,860 B2 * 12/2018 Ghoshal ................. H10N 10/13
10,790,403 B1 * 9/2020 Winn ......................... G06T 5/50
10,886,747 B2 * 1/2021 Yoshida .................. H01J 45/00
2002/0127495 A1 * 9/2002 Scherer ..................... G03F 7/16 430/5
2005/0016575 A1 * 1/2005 Kumar ................... H10N 10/00 136/205
2006/0042674 A1 * 3/2006 Fujii ........................ H02N 3/00 429/11
2006/0188069 A1 * 8/2006 Anno ....................... H05G 1/04 378/130
2009/0161058 A1 * 6/2009 Sherman ............... B32B 27/281 349/153
2011/0100430 A1 * 5/2011 Zak, Jr. ................ H01G 9/2022 136/248
2011/0100749 A1 * 5/2011 Nonogi ................... B32B 27/12 181/291
2012/0153772 A1 * 6/2012 Landa ..................... B28B 11/24 428/221
2013/0169108 A1 * 7/2013 Cheatham, III ........ H01J 29/02 315/363
2013/0180562 A1 * 7/2013 Monfray ................ H01J 45/00 438/54
2015/0325419 A1 * 11/2015 Lee ......................... H01J 45/00 310/306
2016/0017786 A1 * 1/2016 Kimura ................. F01N 13/146 60/320
2017/0183772 A1 * 6/2017 Bargatin ................. C23C 16/12
2019/0027347 A1 * 1/2019 Schwede ................. H01J 45/00
2019/0237313 A1 * 8/2019 Davidson ................ H01J 45/00
2021/0091291 A1 * 3/2021 Birmingham ....... H01M 4/9058
2021/0384019 A1 * 12/2021 Kimura ................... H01J 45/00
2021/0399190 A1 * 12/2021 Birmingham ........... H02S 40/38
2022/0139687 A1 * 5/2022 Campbell ............... H01J 9/185 310/306
2023/0066425 A1 * 3/2023 Kimura ................... H01J 45/00

FOREIGN PATENT DOCUMENTS

JP 2004-147397 A 5/2004
JP 2005-539401 A 12/2005
JP 2007-37318 A 2/2007
JP 2007-267533 A 10/2007
JP 2013-229971 A 11/2013
JP 2016-25208 A 2/2016
JP 6147901 B1 6/2017
JP 2018-137096 A 8/2018
JP 2020-13886 A 1/2020
JP 2021-192569 A 12/2021

OTHER PUBLICATIONS

Japanese Office Action dated Oct. 11, 2024, issued in Japanese Patent Application No. 2021-136910 (with English translation).

* cited by examiner

THERMIONIC POWER GENERATION ELEMENT AND THERMIONIC POWER GENERATION MODULE

CROSS-REFERENCE TO RELATED APPLICATIONS

This application is based upon and claims the benefit of priority from Japanese Patent Application No. 2021-136910, filed on Aug. 25, 2021; the entire contents of which are incorporated herein by reference.

FIELD

Embodiments described herein relate generally to a thermionic power generation element and a thermionic power generation module.

BACKGROUND

For example, there is a thermionic power generation element that includes a cathode (an emitter electrode) to which heat is applied from a heat source, and an anode (a collector electrode) that captures thermions from the cathode. It is desirable to increase the efficiency of the thermionic power generation element.

DETAILED DESCRIPTION

Figure 1:
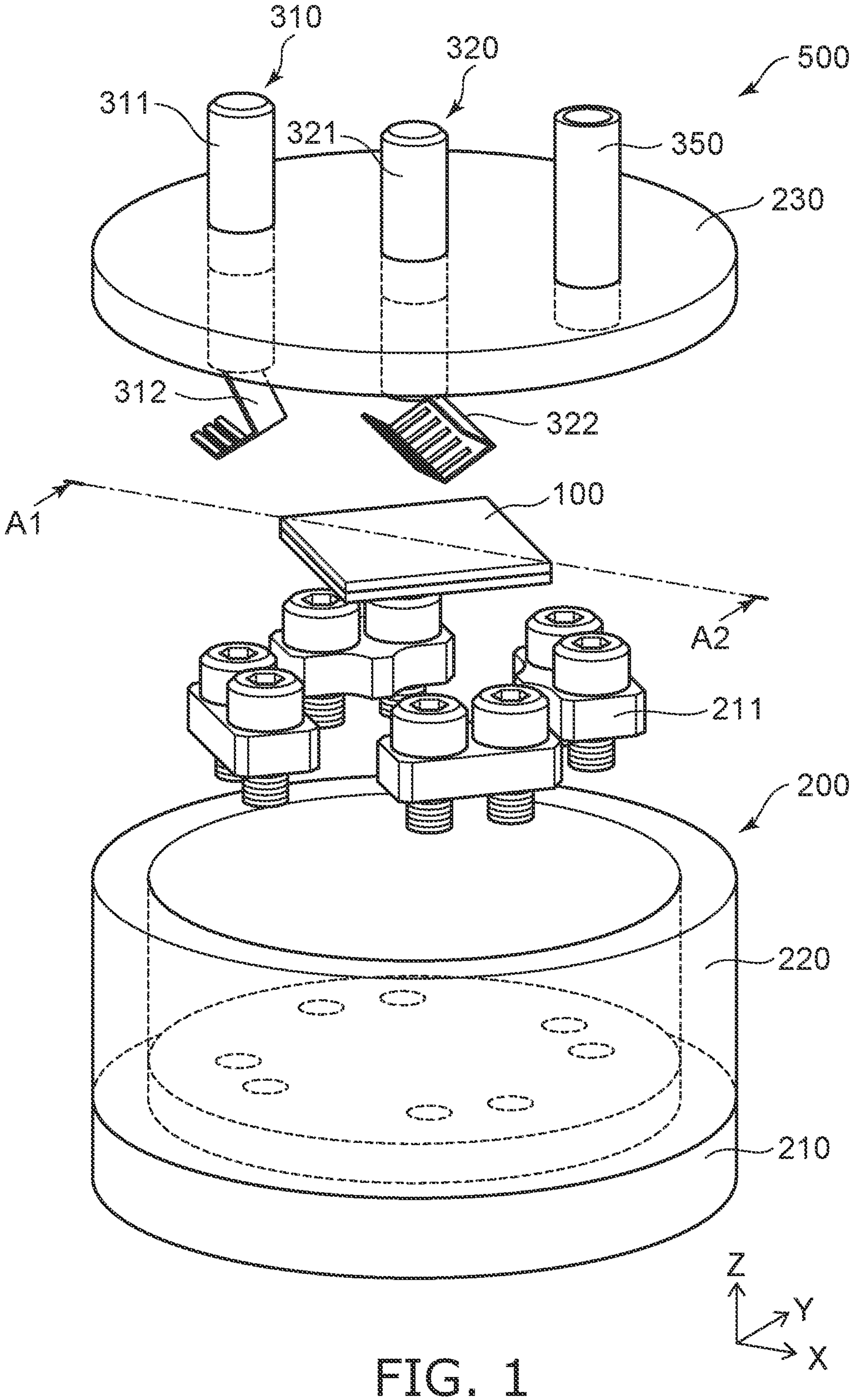
FIG. 1 is an exploded perspective view showing a thermionic power generation module according to a first embodiment.

According to an embodiment of the invention, a thermionic power generation element includes a cathode, an anode, and an insulating member. The cathode includes an electrically-conductive material. The anode includes an electrically-conductive material. The insulating member is located between the cathode and the anode. A gap is provided between the cathode and the anode. A first through-hole is provided in the anode. The first through-hole extends through the anode in a first direction that is from the cathode toward the anode; and the first through-hole communicates with the gap.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is an exploded perspective view showing a thermionic power generation module according to a first embodiment.

Figure 2:
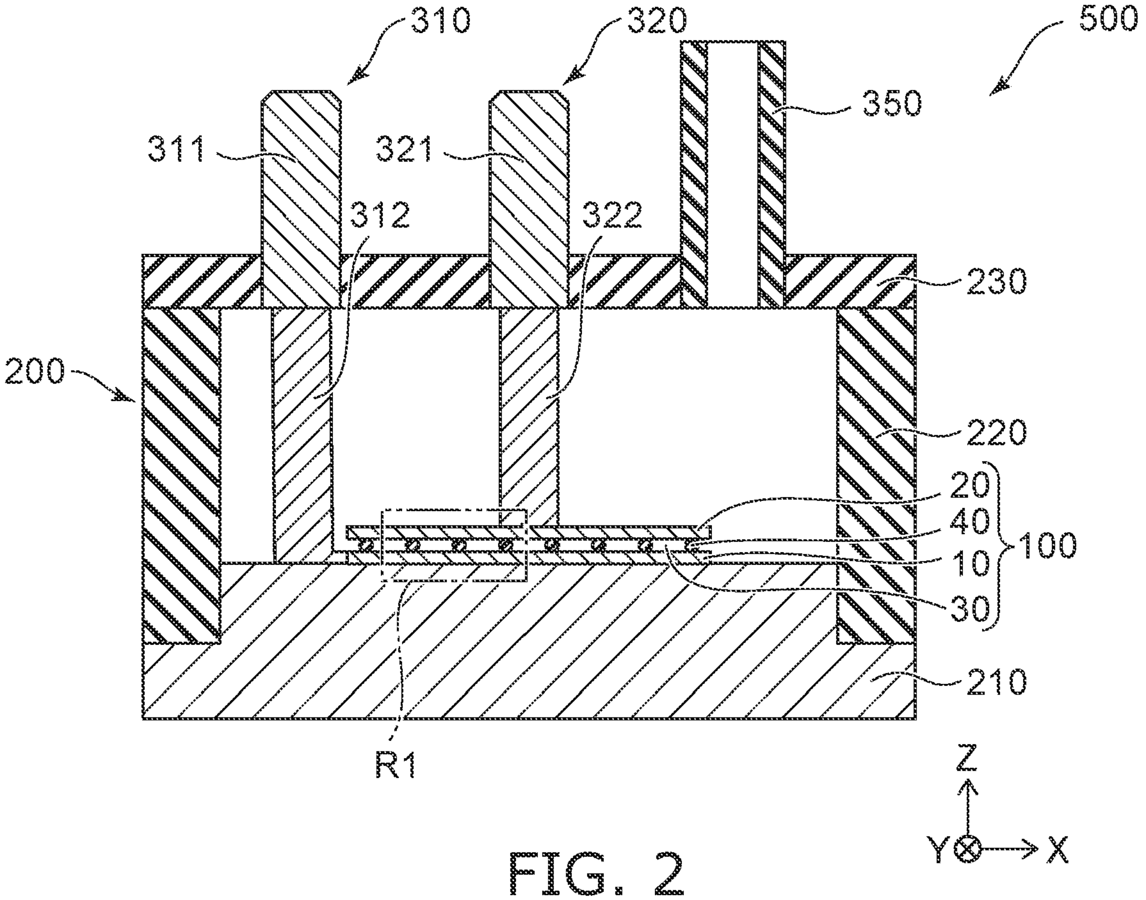
FIG. 2 is a schematic cross-sectional view showing the thermionic power generation module according to the first embodiment.

FIG. 2 is a schematic cross-sectional view showing the thermionic power generation module according to the first embodiment. FIG. 2 is a schematic cross-sectional view at the position of line A1-A2 shown in FIG. 1.

As illustrated in FIGS. 1 and 2, the thermionic power generation module 500 according to the first embodiment includes a thermionic power generation element 100, a container 200, a first terminal 310, a second terminal 320, and a gas supplier 350.

The thermionic power generation element 100 includes a cathode 10, an anode 20, and an insulating member 40. The cathode 10 and the anode 20 include electrically-conductive materials. The insulating member 40 is located between the cathode 10 and the anode 20. The insulating member 40 includes an insulating material. A gap 30 is provided between the cathode 10 and the anode 20. The detailed structure of the thermionic power generation element 100 is described below.

In the following description, the direction from the cathode 10 toward the anode 20 is taken as a first direction. The first direction is, for example, a Z-axis direction. Hereinbelow, the positive orientation of the Z-axis direction may be taken as "up" or "upward"; and the negative orientation of the Z-axis direction may be taken as "down" or "downward". A direction that is orthogonal to the first direction is taken as a second direction. The second direction is, for example, an X-axis direction. A direction that is orthogonal to the first and second directions is taken as a third direction. The third direction is, for example, a Y-axis direction. For example, the cathode 10 and the anode 20 are substantially parallel to the X-Y plane.

For example, a temperature difference is provided between the cathode 10 and the anode 20. In one example, the temperature of the cathode 10 is greater than the temperature of the anode 20. Thereby, electrons are emitted from the cathode 10 toward the anode 20. The electrons can be extracted as electrical power. Thermionic power generation is performed in the thermionic power generation element 100. The current (the electrical power) that is obtained from the thermionic power generation increases as the temperature difference between the cathode 10 and the anode 20 increases. When the temperature of the cathode 10 is greater than the temperature of the anode 20, the cathode 10 is an emitter; and the anode 20 is a collector.

The container 200 houses the thermionic power generation element 100. That is, the thermionic power generation element 100 is located inside the container 200. The container 200 is airtight. For example, the atmosphere inside the container 200 is less than atmospheric pressure.

The container 200 includes, for example, a pedestal part 210, a sidewall part 220, and a lid part 230. The pedestal part 210 is positioned under the thermionic power generation element 100 and supports the thermionic power generation element 100. For example, the pedestal part 210 contacts the cathode 10. Heat is conducted to the cathode 10 when the pedestal part 210 is heated. The sidewall part 220 is located on the pedestal part 210. The pedestal part 210 may include an alignment part 211. The alignment part 211 is fixed on the pedestal part 210. The alignment part 211 maintains the thermionic power generation element 100 at a prescribed position in directions along the X-Y plane. For example, the sidewall part 220 is fused to the pedestal part 210. The sidewall part 220 has a tubular shape that extends in the Z-axis direction and surrounds the thermionic power generation element 100 in directions along the X-Y plane. The lid part 230 is located on the sidewall part 220 and covers the top of the thermionic power generation element 100. The pedestal part 210 includes, for example, an electrically-conductive material. The pedestal part 210 includes, for example, Kovar. The sidewall part 220 and the lid part 230 include, for example, insulating materials. The sidewall part 220 and the lid part 230 include, for example, glass. The sidewall part 220 and the lid part 230 may include electrically-conductive materials.

The first terminal 310 is electrically connected with the cathode 10. For example, a current that is obtained by the power generation of the thermionic power generation element 100 is extracted via the first terminal 310. The first terminal 310 protrudes out of the container 200. In the example, the first terminal 310 is mounted to the lid part 230; one end of the first terminal 310 is positioned inside the container 200 and is electrically connected with the cathode 10; and the other end of the first terminal 310 protrudes upward from the lid part 230.

The first terminal 310 includes, for example, an electrode portion 311 and an elastic body portion 312. The electrode portion 311 and the elastic body portion 312 include electrically-conductive materials. The elastic body portion 312 contacts the cathode 10 and electrically connects the cathode 10 and the electrode portion 311. For example, the elastic body portion 312 is located between the pedestal part 210 and the electrode portion 311 in the Z-axis direction.

The elastic body portion 312 includes, for example, an elastic body such as a spring, etc. The shape of the spring may be one of a knife-edge shape, or a saw shape that includes an unevenness. The spring may be one of a point contact type that has point contact with the pedestal part 210, a line contact type that has line contact with the pedestal part 210, or a surface contact type that has surface contact with the pedestal part 210. In the example, the elastic body portion 312 is a leaf spring. For example, the elastic body portion 312 can absorb the deformation of the pedestal part 210 and/or the electrode portion 311 when the pedestal part 210 and/or the electrode portion 311 expand and contract due to a temperature change. Damage of the pedestal part 210 and/or the electrode portion 311 can be suppressed thereby, even when the pedestal part 210 and/or the electrode portion 311 deform. The elastic body portion 312 is provided as necessary and is omissible.

The second terminal 320 is electrically connected with the anode 20. For example, the current that is obtained by the power generation of the thermionic power generation element 100 is extracted via the second terminal 320. The second terminal 320 protrudes out of the container 200. In the example, the second terminal 320 is mounted to the lid part 230; one end of the second terminal 320 is positioned inside the container 200 and electrically connected with the anode 20; and the other end of the second terminal 320 protrudes upward from the lid part 230.

The second terminal 320 includes, for example, an electrode portion 321 and an elastic body portion 322. The electrode portion 321 and the elastic body portion 322 include electrically-conductive materials. The elastic body portion 322 contacts the anode 20 and electrically connects the anode 20 and the electrode portion 321. For example, the elastic body portion 322 is located between the anode 20 and the electrode portion 321 in the Z-axis direction.

The elastic body portion 322 includes, for example, an elastic body such as a spring, etc. The shape of the spring may be one of a knife-edge shape, or a saw shape that includes an unevenness. Also, the spring may be one of a point contact type that has point contact with the anode 20, a line contact type that has line contact with the anode 20, or a surface contact type that has surface contact with the anode 20. In the example, the elastic body portion 322 is a leaf spring. For example, the elastic body portion 322 urges the anode 20 toward the cathode 10 (i.e., downward). Thereby, the anode 20 is pressed onto the insulating member 40 located between the anode 20 and the cathode 10. For example, the elastic body portion 322 can absorb the deformation of the anode 20 and/or the electrode portion 321 when the anode 20 and/or the electrode portion 321 expand and contract due to a temperature change. Thereby, damage of the anode 20 and/or the electrode portion 321 can be suppressed even when the anode 20 and/or the electrode portion 321 deform. The elastic body portion 322 is provided as necessary and is omissible. When the elastic body portion 322 is omitted, it is favorable for an elastic body member that urges the anode 20 toward the cathode 10 to be included. In such a case, the elastic body member may not include an electrically-conductive material.

The gas supplier 350 supplies Cs (cesium), Ba (barium), Li (lithium), Na (sodium), K (potassium), etc., into the container 200. The gas supplier 350 may supply another alkaline metal or alkaline earth metal. Among these elements, Cs or Ba is optimal and is described herein. The gas supplier 350 is connected to the container 200. In the example, the gas supplier 350 is mounted to the lid part 230 and protrudes upward from the lid part 230. One end of the gas supplier 350 is a closed tubular shape; and Cs or Ba is stored inside the gas supplier 350. For example, the gas supplier 350 includes Cs or Ba in an interior wall surface of the gas supplier 350. The gas supplier 350 communicates with the interior of the container 200. When the gas supplier 350 is heated, the Cs or the Ba that is stored inside the gas supplier 350 is supplied to the interior of the container 200 in a vaporized state. By including the gas supplier 350, Cs or Ba can be stably supplied to the interior of the container 200. As described below, the efficiency of the power generation can be increased by supplying Cs or Ba to the interior of the container 200. The gas supplier 350 may include a heater that vaporizes Cs or Ba, and a pump or fan that efficiently feeds Cs or Ba into the container.

Figure 3A:
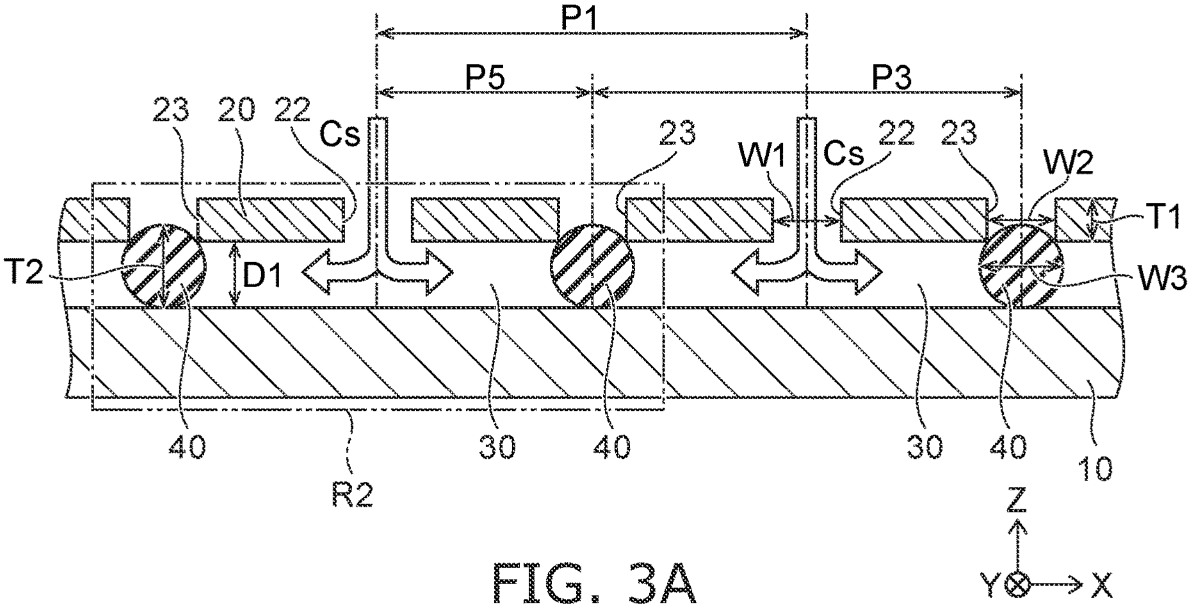
FIGS. 3A and 3B are schematic cross-sectional views showing the thermionic power generation element according to the first embodiment.
Figure 3B:
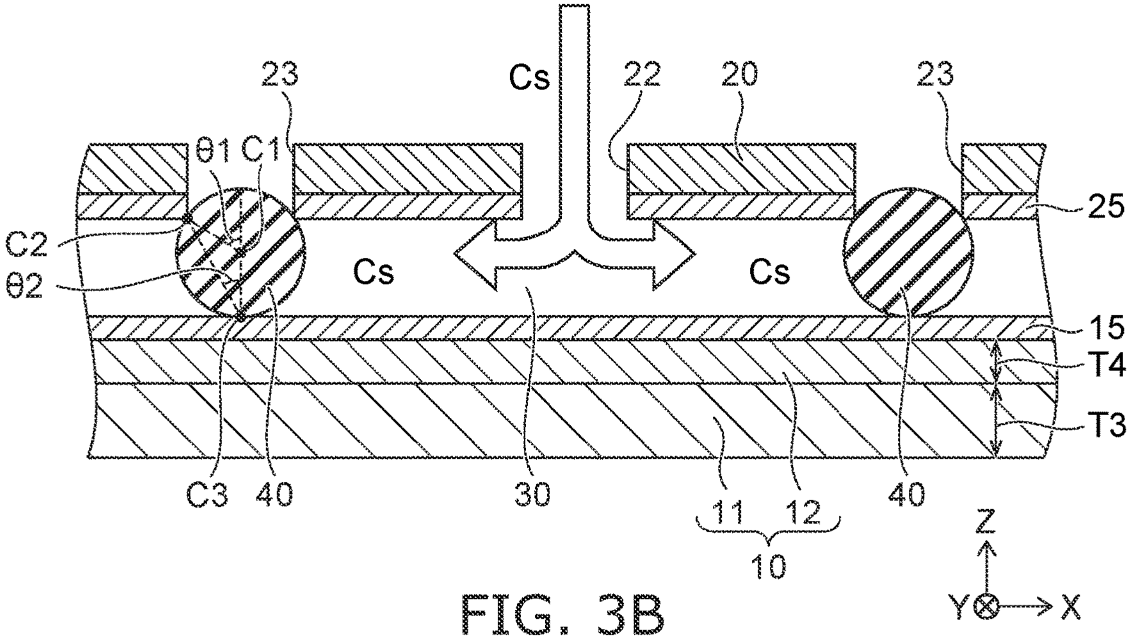

FIGS. 3A and 3B are schematic cross-sectional views showing the thermionic power generation element according to the first embodiment.

FIG. 3A is an enlarged view of region R1 shown in FIG. 2.

FIG. 3B is an enlarged view of region R2 shown in FIG. 3A.

In FIGS. 3A and 3B, the container 200, the first terminal 310, and the second terminal 320 are not illustrated, and only the thermionic power generation element 100 is illustrated.

As illustrated in FIGS. 3A and 3B, spacing is provided between the cathode 10 and the anode 20 in the Z-axis direction.

The gap 30 and the insulating member 40 are located in the region between the cathode 10 and the anode 20. The insulating member 40 is located in a portion of the region between the cathode 10 and the anode 20. The gap 30 is located in another portion of the region between the cathode 10 and the anode 20. The gap 30 is the portion of the region between the cathode 10 and the anode 20 at which the insulating member 40 is not located. The gap 30 is arranged with the insulating members 40 in directions along the X-Y plane. A portion of the gap 30 is positioned between two insulating members 40 in the X-axis direction. A portion of the gap 30 is positioned between two insulating members 40 in the Y-axis direction.

The distance along the Z-axis direction between the cathode 10 and the anode 20 is taken as a gap length D1. The current that is obtained can be increased by reducing the gap length D1. For example, the efficiency of the power generation can be increased.

The insulating member 40 supports the anode 20. The insulating member 40 functions as a spacer between the cathode 10 and the anode 20. For example, the insulating member 40 contacts the cathode 10 at the lower portion of the insulating member 40. For example, the insulating member 40 contacts the anode 20 at the upper portion of the insulating member 40. By providing the insulating member 40, the gap length D1 can be small while suppressing contact between the cathode 10 and the anode 20. By providing the insulating member 40, a stable gap length D1 is obtained.

A first through-hole 22 is provided in the anode 20. The first through-hole 22 extends through the anode 20 in the Z-axis direction. The first through-hole 22 communicates with the gap 30. For example, multiple first through-holes 22 are provided in the anode 20. By providing the first through-hole 22, the Cs or the Ba that is supplied from the gas supplier 350 to the interior of the container 200 can easily reach the gap 30. Also, the excessive Cs or Ba that is supplied is discharged from the gap 30; therefore, the adhesion of Cs or Ba to the insulating member 40 and the occurrence of leakage between the anode 20 and the cathode 10 can be suppressed. The efficiency of the power generation can be increased thereby. For example, the first through-hole 22 is formed by irradiating a laser on the anode 20.

A second through-hole 23 is provided in the anode 20. The second through-hole 23 extends through the anode 20 in the Z-axis direction. The insulating member 40 is positioned between the cathode 10 and the second through-hole 23 in the Z-axis direction. A portion of the insulating member 40 is positioned inside the second through-hole 23. For example, multiple second through-holes 23 are provided in the anode 20. By providing the second through-hole 23, the position of the insulating member 40 is easily fixed by the second through-hole 23. Accordingly, a stable gap length D1 is easily obtained. For example, the second through-hole 23 is formed by irradiating a laser on the anode 20. The second through-hole 23 is provided as necessary and is omissible.

The first through-hole 22 and the second through-hole 23 are, for example, circular when viewed in plan. The first through-hole 22 and the second through-hole 23 may be, for example, polygonal, etc., when viewed in plan.

The length in the X-axis direction of the first through-hole 22 is taken as a width W1. The width W1 is, for example, not less than 1 μm and not more than 0.9 mm, and favorably about 0.1 to 0.4 mm. The length in the X-axis direction of the second through-hole 23 is taken as a width W2. The width W2 is, for example, not less than 1 μm and not more than 0.9 mm, and favorably about 0.1 to 0.4 mm. The width W1 may be greater than the width W2, equal to the width W2, or less than the width W2. When the width W1 and the width W2 are equal, it is unnecessary to discriminate between the first through-hole 22 and the second through-hole 23 when forming the through-holes; therefore, it is favorable for the widths W1 and W2 to be equal from the perspective of manufacturing.

In the example, the length in the Y-axis direction of the first through-hole 22 is substantially equal to the length in the X-axis direction of the first through-hole 22 (i.e., the width W1). The length in the Y-axis direction of the first through-hole 22 may be less than the width W1 or greater than the width W1. In the example, the length in the Y-axis direction of the second through-hole 23 is equal to the length in the X-axis direction of the second through-hole 23 (i.e., the width W2). The length in the Y-axis direction of the second through-hole 23 may be less than the width W2 or greater than the width W2.

In the example, the insulating member 40 is spherical. When the insulating member 40 is spherical, the thermal conduction between the insulating member 40 and the cathode 10 can be suppressed because the contact area between the insulating member 40 and the cathode 10 is small. Also, when the insulating member 40 is spherical, the upper portion of the insulating member 40 is easily positioned inside the second through-hole 23. The shape of the insulating member 40 is not limited to spherical and may be substantially a sphere that includes an unevenness. Examples of other shapes are described below.

The length in the X-axis direction of the insulating member 40 is taken as a width W3. It is favorable for the width W3 to be greater than the width W2. Thereby, the insulating member 40 can be prevented from passing through the second through-hole 23. The width W3 is, for example, not less than 1 μm and not more than 1 mm, and favorably about 0.2 to 0.5 mm.

In the example, the length in the Y-axis direction of the insulating member 40 is substantially equal to the length in the X-axis direction of the insulating member 40 (i.e., the width W3). The length in the Y-axis direction of the insulating member 40 may be less than the width W3 or greater than the width W3. It is favorable for the length in the Y-axis direction of the insulating member 40 to be greater than the length in the Y-axis direction of the second through-hole 23.

When the insulating member 40 is particulate, the average particle size of the insulating member 40 can be considered to be the length in the X-axis direction of the insulating member 40 (i.e., the width W3) and the length in the Y-axis direction of the insulating member 40.

The length in the Z-axis direction of the anode 20 is taken as a thickness T1. For example, it is favorable for the width W2 to be greater than the thickness T1. Thereby, the electrical contact with the elastic body portion 322 is not obstructed, and the insulating member 40 does not protrude from the upper surface of the anode 30. The thickness T1 is, for example, not less than 100 μm and not more than 2 mm, and favorably about 0.2 to 1 mm.

The length in the Z-axis direction of the insulating member 40 is taken as a thickness T2. It is favorable for the gap length D1 to be less than the thickness T2. The gap length D1 can be less than the thickness T2 by providing the second through-hole 23 and by positioning a portion of the insulating member 40 inside the second through-hole 23. The thickness T2 may be greater than the width W1 or less than the width W1. The gap length D1 substantially matches the thickness T2 when a portion of the insulating member 40 is not positioned inside the second through-hole 23.

The gap length D1 is, for example, not less than 1 μm and not more than 1 mm, and favorably not less than 0.1 mm and not more than 0.5 mm. By setting the gap length D1 to be not less than 1 μm, for example, a stable gap length D1 is easily obtained. By setting the gap length D1 to be not less than 1 μm, for example, a reduction of the temperature difference between the cathode 10 and the anode 20 due to radiation can be suppressed. For example, the current that is obtained can be increased by setting the gap length D1 to be not more than 1 mm.

It is favorable for the contact area between the insulating member 40 and the cathode 10 to be, for example, less than the contact area between the insulating member 40 and the anode 20. For example, it is favorable for the insulating member 40 to have a point contact with the cathode 10.

The cathode 10 includes an electrically-conductive material. The cathode 10 includes, for example, at least one of a metal or a semiconductor. It is favorable for the cathode 10 to include an n-type semiconductor, and more favorable to include an n-type wide bandgap semiconductor. The cathode 10 includes, for example, at least one selected from the group consisting of diamond, SiC, GaN, AlGaN, AlN, and ZnO. The efficiency of the power generation can be increased by the cathode 10 including an n-type wide bandgap semiconductor.

For example, the cathode 10 has a multilayer structure. The cathode 10 includes, for example, a first layer 11 and a second layer 12. For example, the first layer 11 contacts the pedestal part 210 of the container 200. An adhesive layer may be located between the first layer 11 and the pedestal part 210. The second layer 12 is positioned between the first layer 11 and the anode 20 in the first direction. That is, the second layer 12 is located on the first layer 11.

The material that is included in the first layer 11 is different from the material included in the second layer 12. The first layer 11 includes, for example, at least one selected from the group consisting of n-SiC, n-Si, n-GaN, n-$Al_xGa_{1-x}N$ ($0<x<1$), n-AlN, and n-$Ga_2O_3$. The second layer 12 includes, for example, at least one selected from the group consisting of n-$Al_yGa_{1-y}N$ ($0<y<1$) and n-diamond. Here, when n-GaN or n-$Al_yGa_{1-y}N$ is selected as the first layer 11, it is favorable for the magnitude relationship of x and y to be $y>x$.

For example, the electron affinity of the second layer 12 is less than the electron affinity of the first layer 11. The electrons are easily emitted thereby.

For example, the electrical resistivity of the first layer 11 is less than the electrical resistivity of the second layer 12. The electrical conductivity of the cathode 10 can be improved thereby.

The length in the Z-axis direction of the first layer 11 is taken as a thickness T3. The thickness T3 is, for example, not less than 100 μm and not more than 2 mm, and favorably about 300 μm. The length in the Z-axis direction of the second layer 12 is taken as a thickness T4. It is favorable for the thickness T4 to be less than the thickness T3. The thickness T4 is, for example, not less than 1 nm and not more than 500 nm, and favorably about 20 nm.

It is favorable for a first surface layer 15 to be located at the surface of the cathode 10. The first surface layer 15 is located at the surface at the side of the cathode 10 that faces the anode 20. That is, the first surface layer 15 is located on the cathode 10. The first surface layer 15 includes Cs or Ba. The thickness of the first surface layer 15 is, for example, not less than 0.1 nm and not more than 1 nm. By including the first surface layer 15, the electrons are easily emitted. The first surface layer 15 may have a continuous film shape, a mesh shape, or a discontinuous island configuration. The first surface layer 15 may be a region to which the elements described above are adsorbed. For example, the first surface layer 15 is formed of Cs or Ba supplied from the gas supplier 350.

When the insulating member 40 is spherical or substantially spherical, an angle θ1 ($0°<\theta 1<90°$) is formed between the direction (the Z-axis direction) from a center C1 of the insulating member 40 toward the anode 20 and the direction from the center C1 of the insulating member 40 toward a contact point C2 between the insulating member 40 and the anode 20. The contact point C2 between the insulating member 40 and the anode 20 may be any one location. When θ1 is small, the contact area between the insulating member 40 and the anode 20 is small and unstable. When θ1 is 90°, the insulating member 40 cannot be fixed to the second through-hole 23. It is favorable for θ1 to be not less than 30° but less than 90° ($30°\leq\theta 1<90°$). An angle θ2 is formed between the direction (the Z-axis direction) from a contact point C3 between the insulating member 40 and the cathode 10 toward the anode 20 and the direction from the contact point C3 between the insulating member 40 and the cathode 10 toward the contact point C2 between the insulating member 40 and the anode 20. Because θ1 is about 2 times θ2, θ1 being not less than 30° but less than 90° can be rephrased as θ2 being not less than 15° but less than 45°. For example, the point that is used as the center C1 of the insulating member 40 may be the centroid of the insulating member 40, a centroid of a figure of a parallel projection of the insulating member 40 in any direction, the intersection of perpendicular bisectors of any two chords of a figure of a parallel projection of the insulating member 40 in any direction, etc.

The anode 20 includes an electrically-conductive material. The anode 20 includes, for example, at least one of a metal or a semiconductor. It is favorable for the anode 20 to include, for example, stainless steel (SUS). It is favorable for the resistivity of the anode 20 to be equal to or less than the resistivity of the cathode 10. The anode 20 may be a semiconductor as long as these conditions are satisfied. For example, n-Si, n-GaN, n-AlGaN, or n-SiC may be used.

It is favorable for a second surface layer 25 to be located at the surface of the anode 20. The second surface layer 25 is located at the surface at the side of the anode 20 that faces the cathode 10. That is, the second surface layer 25 is located under the anode 20. The second surface layer 25 includes Cs or Ba. The thickness of the second surface layer 25 is, for example, not less than 0.1 nm and not more than 1 nm. By including the second surface layer 25, the electrons are easily accepted. The second surface layer 25 may have a continuous film shape, a mesh shape, or a discontinuous island configuration. The second surface layer 25 may be a region to which the elements described above are adsorbed. For example, the second surface layer 25 is formed of Cs or Ba supplied from the gas supplier 350. It is favorable for the work function of the anode 20 surface that includes the second surface layer 25 to be equal to or less than the work function of the cathode 10 surface that includes the first surface layer 15.

The insulating member 40 includes an insulating material. The insulating member 40 includes, for example, at least one selected from the group consisting of aluminum oxide and silicon oxide. The insulating member 40 is, for example, a bead that includes an insulating material. When multiple insulating members 40 are included, it is favorable for the sizes of the insulating members 40 (the width W3 and/or the thickness T2) to be substantially equal; however, for example, an error of about ±20% may exist.

Considering an example in which the insulating member 40 is substantially spherical with a width W3 (an average particle size) of 0.5 mm and the second through-hole 23 has a width W2 (a diameter) of 0.4 mm, if the insulating member 40 has a size of which the width W3 is not less than 0.4 mm, the insulating member 40 can be fixed to the second through-hole 23; and if the insulating member 40 has a size of which the width W3 is less than 0.6 mm, then θ1 is not less than 30°, and the position of the insulating member 40 is stable. It is favorable for $W2<W3\leq 2\times W2$ to be satisfied to satisfy ($30°\leq\theta1<90°$).

If the insulating member 40 extends through the second through-hole 23, there is a possibility that the anode 20 cannot be urged because the elastic body portion 322 contacts the insulating member 40. One of the Z-axis direction end portions of the insulating member 40 is positioned between one surface (the front surface) and the other surface (the back surface) of the anode 20 in the Z-axis direction. In the Z-X cross section, one of the Z-axis direction end portions of the insulating member 40 is positioned between the inner walls of the second through-hole 23 in the X-axis direction. The conditions for the insulating member 40 not extending through the second through-hole 23 will now be considered for an example in which the insulating member 40 is substantially spherical with the width W2=0.4 mm. When the value of the width W3 is changed so that θ1 is not less than 30° but less than 90°, the insulating member 40 does not extend through the second through-hole 23 for any condition if the thickness T1 is greater than the value of half of the width W3 ($T1>0.5\times W3$). Also, the insulating member 40 does not extend through the second through-hole 23 if $(1-\cos\theta1)<T1$.

It is favorable for the thermal conductivity of the insulating member 40 to be less than the thermal conductivity of the cathode 10. It is favorable for the thermal conductivity of the insulating member 40 to be less than the thermal conductivity of the anode 20. The thermal conductivity of the insulating member 40 is, for example, not more than 50. By reducing the thermal conductivity of the insulating member 40, the thermal conduction between the cathode 10 and the anode 20 via the insulating member 40 can be suppressed. The efficiency of the power generation can be increased thereby. The insulating member 40 may be a single material, or may include multiple materials such as a multilayer film, a granular structure, etc., of which the thermal conductivity is not more than 50.

It is favorable for the gap 30 to include Cs or Ba. By the gap 30 including Cs or Ba, the electrons are more easily transferred between the cathode 10 and the anode 20 (between the first surface layer 15 and the second surface layer 25). For example, the Cs or the Ba that is included in the gap 30 is supplied from the gas supplier 350.

Figure 4:
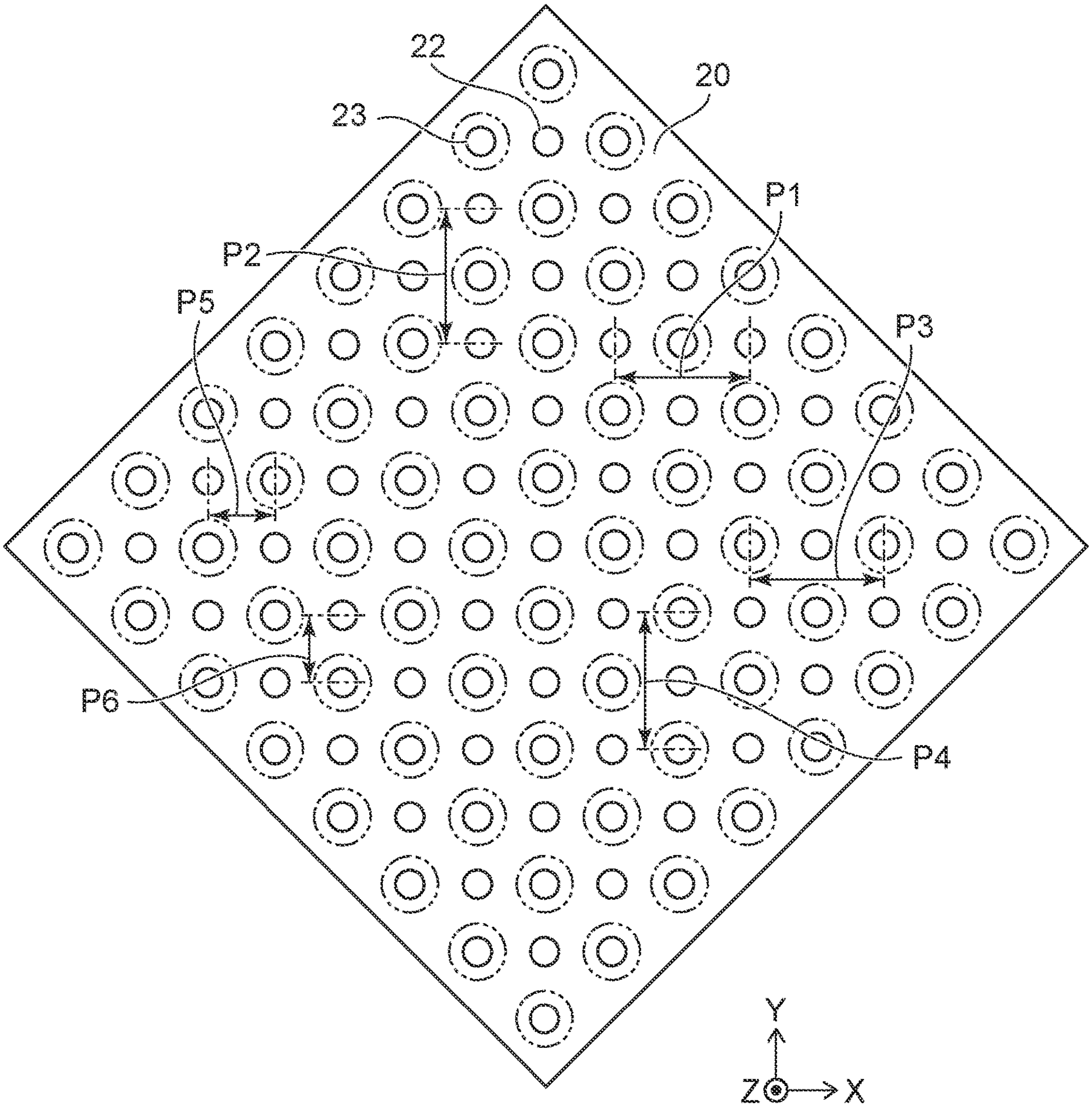
FIG. 4 is a plan view showing the anode of the thermionic power generation element according to the first embodiment.

FIG. 4 is a plan view showing the anode of the thermionic power generation element according to the first embodiment.

The second through-hole 23 is surrounded with a double dot-dash line in FIG. 4.

As illustrated in FIG. 4, for example, the multiple first through-holes 22 and the multiple second through-holes 23 are provided in the anode 20.

In the example, the first through-hole 22 and the second through-hole 23 are alternately arranged in the X-axis direction. That is, one of the second through-holes 23 is positioned between two first through-holes 22 that are next to each other in the X-axis direction. One of the first through-holes 22 is positioned between two second through-holes 23 that are next to each other in the X-axis direction.

In the example, the first through-hole 22 and the second through-hole 23 are alternately arranged in the Y-axis direction. That is, one of the second through-holes 23 is positioned between two first through-holes 22 that are next to each other in the Y-axis direction. One of the first through-holes 22 is positioned between two second through-holes 23 that are next to each other in the Y-axis direction.

The first through-hole 22 and the second through-hole 23 may not be alternately arranged in the X-axis direction and the Y-axis direction. For example, the thermionic power generation element 100 is manufactured by placing the insulating members 40 on the cathode 10 and by placing, on the insulating member 40, the anode 20 in which multiple through-holes are pre-formed. At this time, among the multiple through-holes that are formed in the anode 20, the through-holes that do not overlap the insulating members 40 become the first through-holes 22; and the through-holes that overlap the insulating members 40 become the second through-holes 23. The arrangement of the first and second through-holes 22 and 23 may be random. It is favorable for the first and second through-holes 22 and 23 to be uniformly arranged in the X-axis direction and the Y-axis direction.

The distance between one of the multiple first through-holes 22 and another one of the multiple first through-holes 22 next to the one in the X-axis direction is taken as a pitch P1. It is favorable for the pitch P1 to be constant for all of the first through-holes 22 arranged in the X-axis direction. The pitch P1 is, for example, not less than 1 mm and not more than 5 mm, and favorably about 2.5 mm.

The distance between one of the multiple first through-holes 22 and another one of the multiple first through-holes 22 next to the one in the Y-axis direction is taken as a pitch P2. It is favorable for the pitch P2 to be constant for all of the first through-holes 22 arranged in the Y-axis direction. The pitch P2 is, for example, not less than 1 mm and not more than 5 mm, and favorably about 2.5 mm. It is favorable for the pitch P2 to be equal to the pitch P1.

The distance between one of the multiple second through-holes 23 and another one of the multiple second through-holes 23 next to the one in the X-axis direction is taken as a pitch P3. It is favorable for the pitch P3 to be constant for all of the second through-holes 23 arranged in the X-axis direction. The pitch P3 is, for example, not less than 1 mm and not more than 5 mm, and favorably about 2.5 mm.

The distance between one of the multiple second through-holes 23 and another one of the multiple second through-holes 23 next to the one in the Y-axis direction is taken as a pitch P4. It is favorable for the pitch P4 to be constant for all of the second through-holes 23 arranged in the Y-axis direction. The pitch P4 is, for example, not less than 1 mm and not more than 5 mm, and favorably about 2.5 mm. It is favorable for the pitch P4 to be equal to the pitch P3.

The distance between one of the first through-holes 22 and one of the second through-holes 23 next to the one of the first through-holes 22 in the X-axis direction is taken as a pitch P5. It is favorable for the pitch P5 to be constant for all of the first through-holes 22 and all of the second through-holes 23 arranged in the X-axis direction. It is favorable for the pitch P5 to be, for example, half of the pitch P1 or half of the pitch P3. That is, it is favorable for the first through-hole 22 to be positioned at an intermediate point between two second through-holes 23 that are next to each other in the X-axis direction. It is favorable for the second through-hole 23 to be positioned at an intermediate point between two first through-holes 22 that are next to each other in the X-axis direction.

The distance between one of the first through-holes 22 and one of the second through-holes 23 next to the one of the first through-holes 22 in the Y-axis direction is taken as a pitch P6. It is favorable for the pitch P6 to be constant for all of the first through-holes 22 and all of the second through-holes 23 arranged in the Y-axis direction. It is favorable for the pitch P6 to be, for example, half of the pitch P2 or half of the pitch P4. That is, it is favorable for the first through-hole 22 to be positioned at an intermediate point between two second through-holes 23 that are next to each other in the Y-axis direction. It is favorable for the second through-hole 23 to be positioned at an intermediate point between two first through-holes 22 that are next to each other in the Y-axis direction.

It is favorable for the number of the second through-holes 23 to be, for example, not less than 0.2 times and not more than 5 times the number of the first through-holes 22. It is more favorable for the number of the second through-holes 23 to be, for example, equal to the number of the first through-holes 22. The number of the second through-holes 23 and the number of the first through-holes 22 can be controlled using the number of the insulating members 40. For example, by increasing the number of the insulating members 40, the number of the second through-holes 23 can be increased, and the number of the first through-holes 22 can be reduced.

Figure 5A:
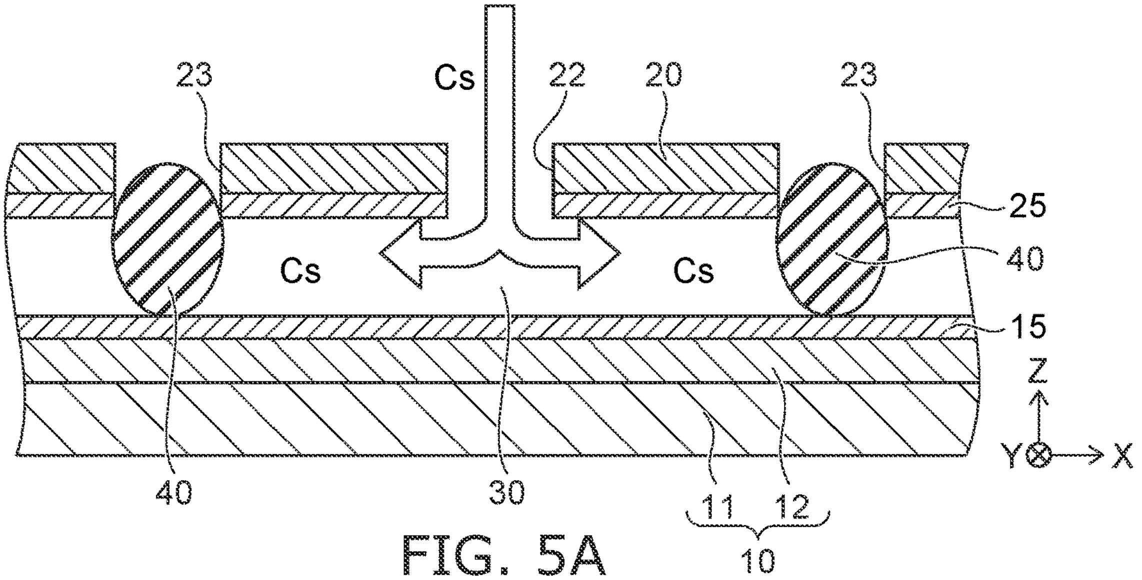
FIGS. 5A to 5C are schematic cross-sectional views showing modifications of the thermionic power generation element according to the first embodiment.
Figure 5B:
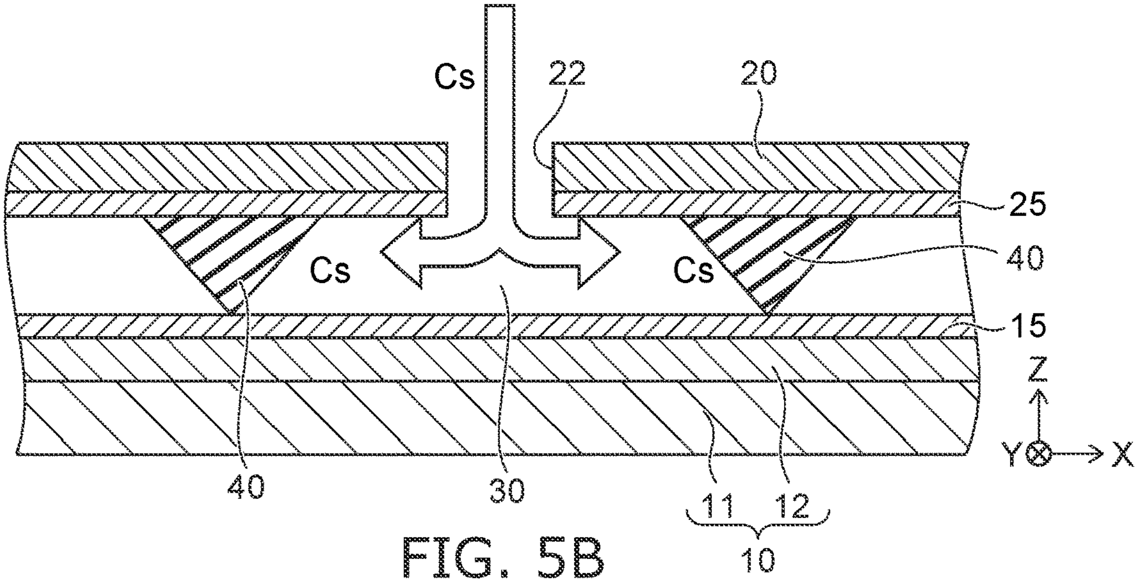
Figure 5C:
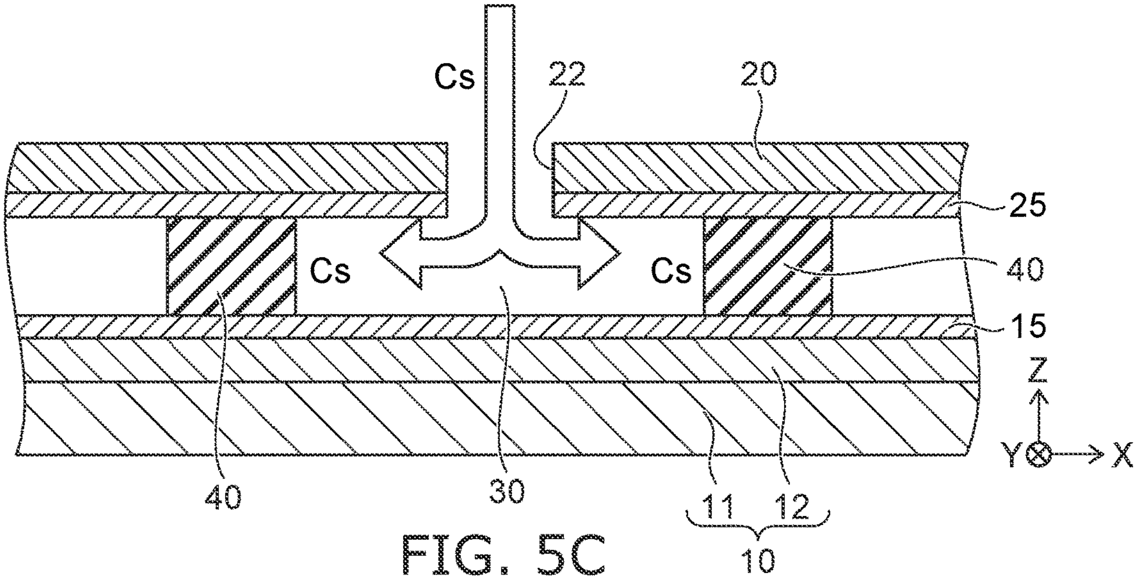

FIGS. 5A to 5C are schematic cross-sectional views showing modifications of the thermionic power generation element according to the first embodiment.

As illustrated in FIG. 5A, the insulating member 40 may be, for example, oblong spherical. If the insulating member 40 is oblong spherical, the contact area between the insulating member 40 and the cathode 10 is small; therefore, the thermal conduction between the insulating member 40 and the cathode 10 can be suppressed. Also, if the insulating member 40 is oblong spherical, the upper portion of the insulating member 40 is easily positioned inside the second through-hole 23. Thereby, the position of the insulating member 40 is easily fixed by the second through-hole 23. Accordingly, a stable gap length D1 is easily obtained.

As illustrated in FIG. 5B, the insulating member 40 may be, for example, circular conical. When the insulating member 40 is circular conical, it is favorable for the planar (bottom surface) portion of the insulating member 40 to face the anode 20, and for the vertex to point toward the cathode 10. The contact area between the insulating member 40 and the cathode 10 can be reduced thereby, and the thermal conduction between the insulating member 40 and the cathode 10 can be suppressed. Although the second through-hole 23 is not provided in the example, the second through-hole 23 may be provided. When a circular conical insulating member 40 is included, for example, the circular conical insulating member 40 can be formed by forming an insulating film under the anode 20 and by patterning the insulating film into a circular conical shape. Thus, the insulating member 40 may be chemically bonded to the anode 20. In such a case, the position of the insulating member 40 can be fixed even when the second through-hole 23 is not provided.

As illustrated in FIG. 5C, the insulating member 40 may be, for example, circular columnar. Although the second through-hole 23 is not provided in the example, the second through-hole 23 may be provided. When a circular columnar insulating member 40 is included, for example, the circular columnar insulating member 40 can be formed by forming an insulating film on the cathode 10 and by patterning the insulating film into a circular columnar shape. When a circular columnar insulating member 40 is included, for example, the circular columnar insulating member 40 can be formed by forming an insulating film under the anode 20 and by patterning the insulating film into a circular columnar shape. Thus, the insulating member 40 may be chemically bonded to the cathode 10 and/or the anode 20. In such a case, the position of the insulating member 40 can be fixed even when the second through-hole 23 is not provided.

The shape of the insulating member 40 is not limited to those described above, and may be truncated circular conical, polygonal pyramidal, polygonal prismatic, truncated polygonal pyramidal, polyhedral, etc.

Figure 6:
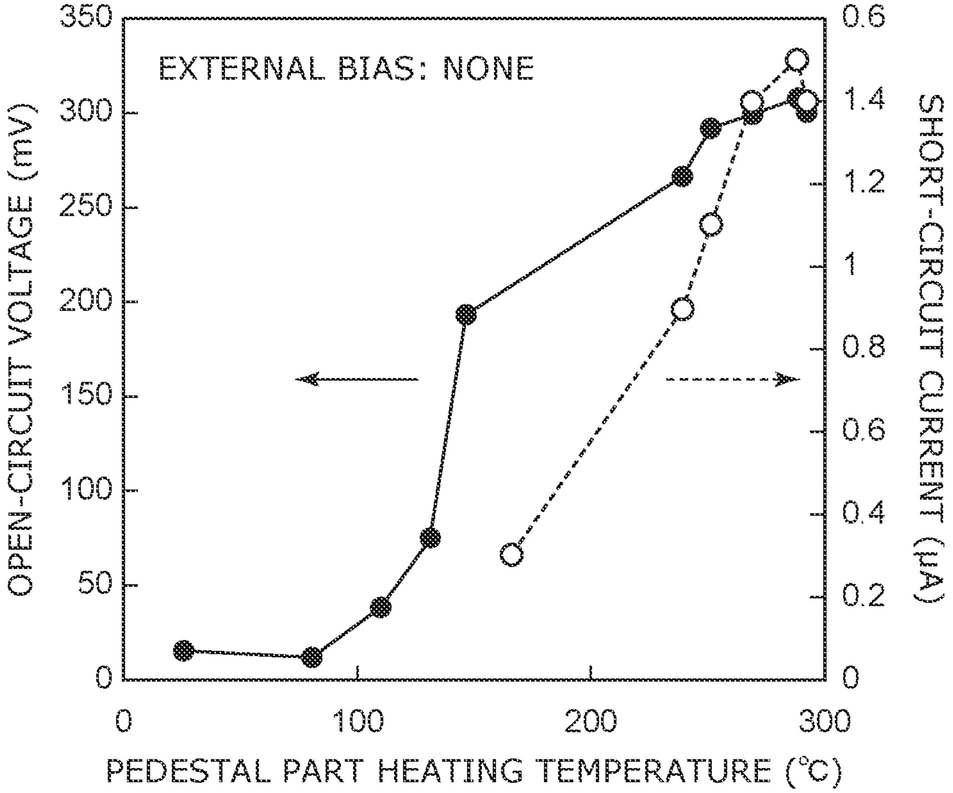
FIG. 6 is a graph showing experiment results of the thermionic power generation module according to the first embodiment.

FIG. 6 is a graph showing experiment results of the thermionic power generation module according to the first embodiment.

In FIG. 6, the change of the open-circuit voltage is shown by a solid line; and the change of the short-circuit current is shown by a broken line.

In the thermionic power generation module 500, the pedestal part 210 of the container 200 was heated, and the temperature at which power generation started was measured. The heating temperature of the pedestal part 210 can approximate the heating temperature of the cathode 10.

In the thermionic power generation module 500 as illustrated in FIG. 6, the power generation started at not less than 100° C.

Figure 7A:
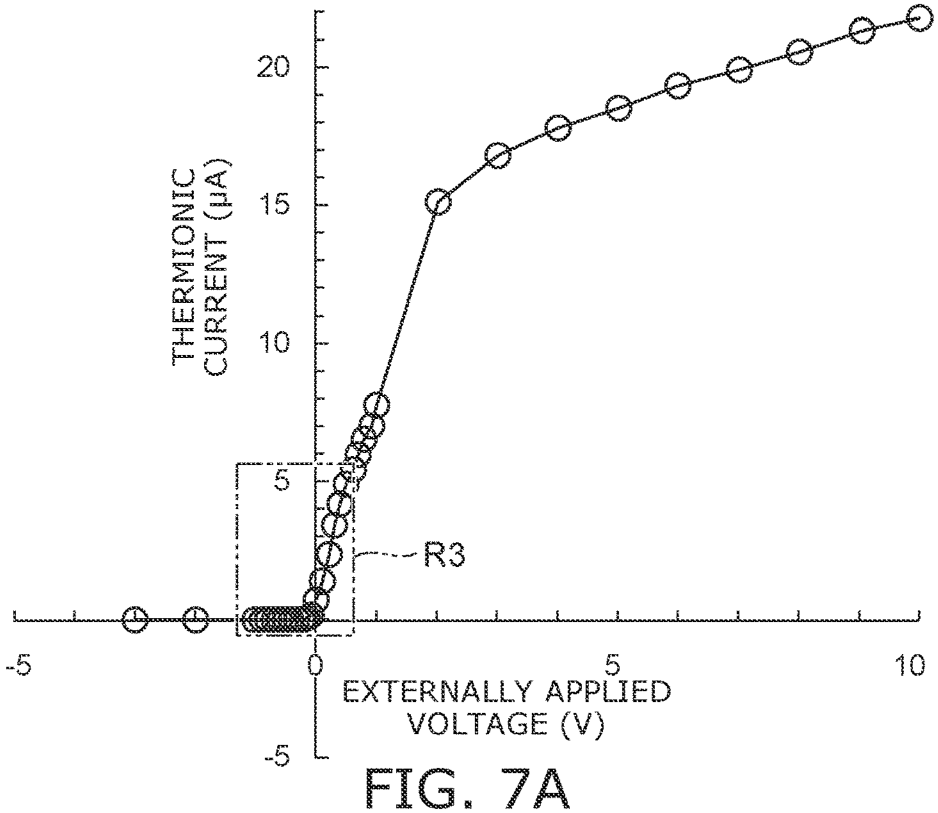
FIGS. 7A and 7B are graphs showing experiment results of the thermionic power generation module according to the first embodiment.
Figure 7B:
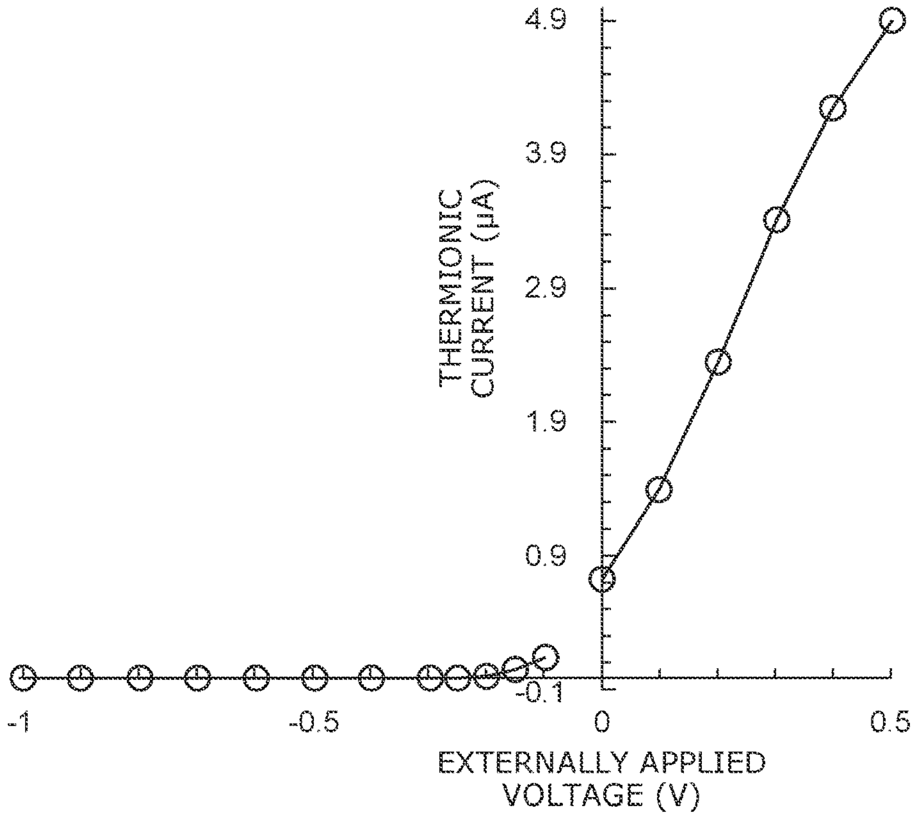

FIGS. 7A and 7B are graphs showing experiment results of the thermionic power generation module according to the first embodiment.

FIG. 7B is an enlarged view of region R3 shown in FIG. 7A.

The existence or absence of leakage was checked for the thermionic power generation module 500.

In the thermionic power generation module 500 as illustrated in FIGS. 7A and 7B, a current was not generated at a reverse bias; and leakage did not occur.

Second Embodiment

Figure 8:
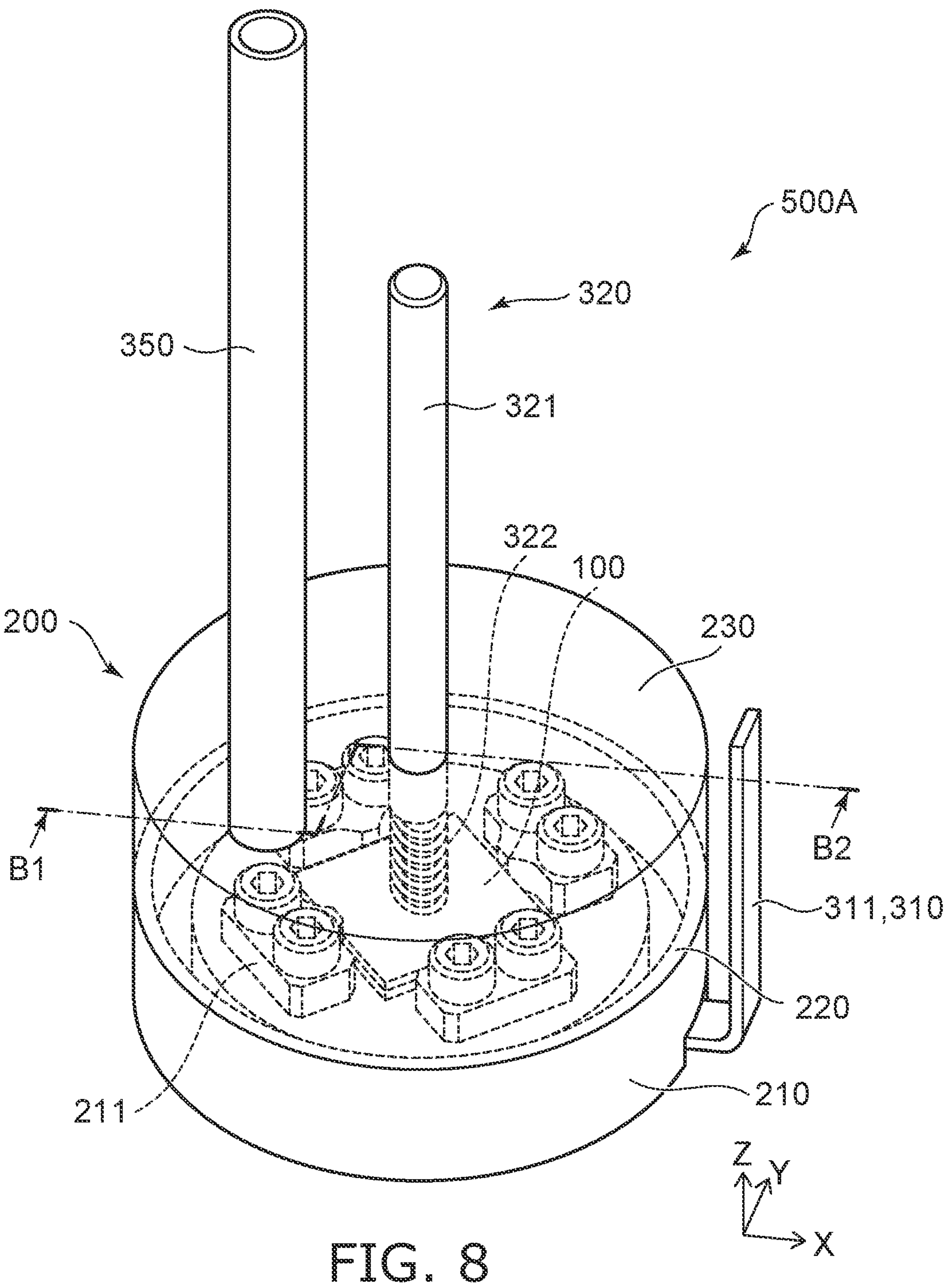
FIG. 8 is a perspective view showing a thermionic power generation module according to a second embodiment.

FIG. 8 is a perspective view showing a thermionic power generation module according to a second embodiment.

Figure 9:
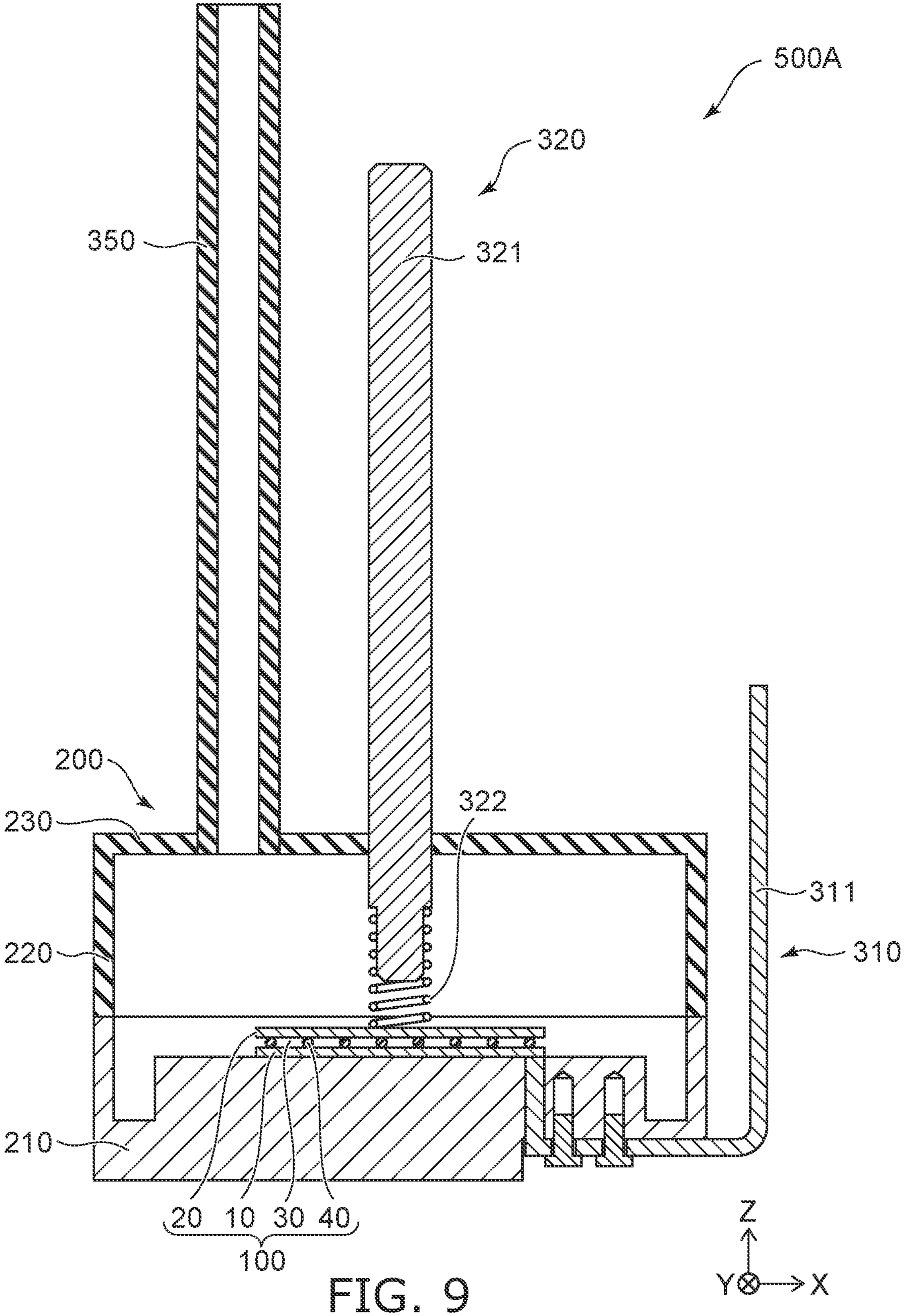
FIG. 9 is a schematic cross-sectional view showing the thermionic power generation module according to the second embodiment.

FIG. 9 is a schematic cross-sectional view showing the thermionic power generation module according to the second embodiment.

FIG. 9 is a schematic cross-sectional view at the position of line B1-B2 shown in FIG. 8.

As illustrated in FIGS. 8 and 9, other than the first and second terminals 310 and 320 being different, the thermionic power generation module 500A according to the second embodiment is substantially the same as the thermionic power generation module 500 according to the first embodiment.

In the thermionic power generation module 500A, the elastic body portion 312 of the first terminal 310 is omitted; and the electrode portion 311 is electrically connected with the cathode 10 and fixed to the lower surface of the pedestal part 210. The current that is obtained by the power generation of the thermionic power generation element 100 can be more reliably extracted thereby.

In the thermionic power generation module 500A, the elastic body portion 322 of the second terminal 320 is a compression coil spring. The elastic body portion 322 is planarized to have surface contact with the anode 20 and the electrode portion 321. Thereby, the anode 20 can be more reliably pressed onto the insulating member 40; and the current that is obtained by the power generation of the thermionic power generation element 100 can be more reliably extracted. By using a compression coil spring as the elastic body portion 322, the deflection amount can be greater than when the elastic body portion 322 is a leaf spring. Deformation due to processing is easily absorbed thereby.

Thus, according to embodiments, a thermionic power generation element and a thermionic power generation module can be provided in which the efficiency can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in thermionic power generation elements and thermionic power generation modules from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all thermionic power generation elements and thermionic power generation modules practicable by an appropriate design modification by one skilled in the art based on the thermionic power generation elements and thermionic power generation modules described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A thermionic power generation element, comprising:
a cathode including an electrically-conductive material;
an anode including an electrically-conductive material; and
an insulating member located between the cathode and the anode,
the cathode and the anode having a gap between the cathode and the anode,
a first through-hole being provided in the anode,
the first through-hole extending through the anode in a first direction and communicating with the gap,
the first direction being from the cathode toward the anode.

2. The element according to claim 1, wherein
a plurality of the first through-holes is provided.

3. The element according to claim 1, wherein
the cathode includes an n-type wide bandgap semiconductor.

4. The element according to claim 1, wherein
the cathode includes:
a first layer; and
a second layer positioned between the first layer and the anode in the first direction, and
an electron affinity of the second layer is less than an electron affinity of the first layer.

5. The element according to claim 1, wherein
the cathode includes:
a first layer; and
a second layer positioned between the first layer and the anode in the first direction, and
an electrical resistivity of the first layer is less than an electrical resistivity of the second layer.

6. The element according to claim 1, wherein
the gap includes Cs or Ba.

7. The element according to claim 1, further comprising:
a first surface layer located at a surface of the cathode,
the first surface layer including Cs or Ba.

8. The element according to claim 1, further comprising:
a second surface layer located at a surface of the anode,
the second surface layer including Cs or Ba.

9. A thermionic power generation module, comprising:
the element according to claim 1;
a container housing the element;
a first terminal protruding out of the container, the first terminal being electrically connected with the cathode; and
a second terminal protruding out of the container, the second terminal being electrically connected with the anode.

10. The module according to claim 9, wherein
an atmosphere inside the container is less than atmospheric pressure.

11. The module according to claim 9, wherein
the second terminal includes an elastic body portion urging the anode toward the cathode, and the elastic body portion includes an electrically-conductive material.

12. The module according to claim 9, further comprising:
a gas supplier connected to the container,
the gas supplier supplying Cs or Ba into the container.

13. The element according to claim 1, wherein
a second through-hole is provided in the anode,
the second through-hole extends through the anode in the first direction,
the insulating member is positioned between the cathode and the second through-hole in the first direction, and
a portion of the insulating member is positioned inside the second through-hole.

14. The element according to claim 13, wherein
a width in a second direction of the insulating member is greater than a width in the second direction of the second through-hole, and
the second direction is orthogonal to the first direction.

15. The element according to claim 14, wherein
a thickness of the anode in the first direction is greater than a value of half of the width of the insulating member.

16. The element according to claim 13, comprising:
a plurality of the insulating members,
a plurality of the second through-holes being provided.

17. The element according to claim 16, wherein an angle between the first direction and a direction from a center of the insulating member toward a contact point between the insulating member and the anode is not less than 30° but less than 90°.

18. The element according to claim 16, wherein a width in a second direction of the insulating member is not more than a value of 2 times a width in the second direction of the second through-hole, and the second direction is orthogonal to the first direction.

* * * * *